(12) United States Patent
Ebenezer et al.

(10) Patent No.: US 12,061,621 B2
(45) Date of Patent: Aug. 13, 2024

(54) BULK DATA EXTRACT HYBRID JOB PROCESSING

(71) Applicant: Bank of America Corporation, Charlotte, NC (US)

(72) Inventors: Daniel Ebenezer, Simi Valley, CA (US); Dilip Raja, Simi Valley, CA (US); Giridhar Nakkala, Simi Valley, CA (US); Jon W. Gulickson, Indian Trail, NC (US); Yadav Khanal, McKinney, TX (US); Miranda Carr, Agoura Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 100 days.

(21) Appl. No.: 17/387,194

(22) Filed: Jul. 28, 2021

(65) Prior Publication Data
US 2023/0030208 A1 Feb. 2, 2023

(51) Int. Cl.
*G06F 16/00* (2019.01)
*G06F 9/52* (2006.01)
*G06F 16/215* (2019.01)
*G06F 16/25* (2019.01)
*G06F 16/901* (2019.01)

(52) U.S. Cl.
CPC .......... *G06F 16/254* (2019.01); *G06F 9/52* (2013.01); *G06F 16/215* (2019.01); *G06F 16/258* (2019.01); *G06F 16/902* (2019.01)

(58) Field of Classification Search
None
See application file for complete search history.

(56) References Cited

U.S. PATENT DOCUMENTS

| | | | |
|---|---|---|---|
| 7,526,486 B2 * | 4/2009 | Cushman, II | G06F 16/215 |
| 2002/0062241 A1 * | 5/2002 | Rubio | G06Q 30/0202 |
| | | | 707/999.002 |
| 2009/0182779 A1 * | 7/2009 | Johnson | G06F 16/24568 |
| 2012/0124081 A1 * | 5/2012 | Ebrahimi | G06F 16/214 |
| | | | 707/769 |
| 2012/0265726 A1 * | 10/2012 | Padmanabhan | G06F 16/214 |
| | | | 707/602 |

(Continued)

FOREIGN PATENT DOCUMENTS

WO WO-2020178327 A1 * 9/2020 ......... G06F 16/2365

*Primary Examiner* — Bai D Vu
(74) *Attorney, Agent, or Firm* — Weiss & Arons LLP (57) ABSTRACT

Methods for hybrid job processing may include receiving raw data records stored within a plurality of tables from a plurality of systems of record at a raw data layer within a data exchange. Methods may include generating, based on a data model, a list of dependencies between the plurality of tables. Each table included in a second subset of the plurality of tables may be dependent on at least one table included in a first subset of the plurality of tables. Methods may include processing the first subset of the plurality of tables concurrently with one another. The processing includes modeling the raw data records and transmitting the modeled data records to the model data layer. Methods may include processing each table included in the second subset after completion of processing of the table included in the first subset from which the table in the second subset depends on.

12 Claims, 4 Drawing Sheets

(56) References Cited

U.S. PATENT DOCUMENTS

| | | | |
|---|---|---|---|
| 2014/0115012 A1* | 4/2014 | Das | G06F 16/211 |
| | | | 707/803 |
| 2019/0286722 A1* | 9/2019 | Barov | G06F 16/211 |
| 2020/0026710 A1* | 1/2020 | Przada | G06F 16/254 |
| 2020/0133929 A1* | 4/2020 | Yamashita | G06F 16/903 |
| 2021/0133196 A1* | 5/2021 | Gladwin | G06F 16/252 |

* cited by examiner

BULK DATA EXTRACT HYBRID JOB PROCESSING

FIELD OF TECHNOLOGY

Aspects of the disclosure relate to bulk data provisioning.

BACKGROUND OF THE DISCLOSURE

Systems have been migrating from mainframe solutions to centralized integrated data platforms. Because of requirements at the integrated data platforms, as well as the large amount of data being integrated, it would be desirable to provide streamlined data provisioning to reduce complexity, increase speed and improve efficiency at the data platforms.

SUMMARY OF THE DISCLOSURE

Apparatus and methods for hybrid job processing is provided. The hybrid job processing may include modeling and transferring data from a raw data layer for delivering to a model data layer. The hybrid job processing may reduce a processing time of more than half a billion records from over 27 hours under 5 hours. The hybrid job processing may reduce a processing time of the raw data records by over 70%. The hybrid job processing may reduce a processing time of the raw data records by any other suitable percentage.

Methods may include receiving raw data records. The raw data records may be stored within a plurality of tables. The raw data records may be received from a plurality of systems or record. The raw data records may be received at the raw data layer within a data exchange. The data exchange may reside on an Oracle Exadata box.

Methods may include generating a list of dependencies between the plurality of tables. The list of dependencies may be based on a data model. Each table included in a second subset of the plurality of tables may be dependent on at least one table included in a first subset of the plurality of tables.

Methods may include processing the first subset of the plurality of tables. Each of the tables included in the first subset of the plurality of tables may be processed concurrently. The processing may include modeling the raw data records stored in the first subset of the plurality of tables. The modeling may be executed at the raw data layer. The modeling may form and/or generate modeled records.

The modeling may include reformatting the raw data records from ASCII format to a format consumable by the data exchange. ASCII stands for American Standard Code for Information Interchange and is a character encoding standard for electronic communication.

The modeled records may be included in the first subset of tables. The processing may include transmitting the modeled records to the model data layer.

Methods may include processing each table included in the second subset of tables. Each table, included in the second subset of tables, may be processed upon completion of processing of the table included in the first subset of tables from which the table included in the second subset of tables depends.

Each of the tables included in the plurality of tables may be labeled on sequence. Tables included in the plurality of tables that are labeled with an odd number may be root tables. Tables included in the plurality of tables that are labeled with an even number may be leaf tables. Leaf tables may depend on root tables. As such, root tables may be included in the first subset of the plurality of tables. Leaf tables may be included in the second subset of the plurality of tables.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for a data exchange is provided. The data exchange may serve as an information hub for an enterprise. Data may be retrieved from various SORs and placed into the data exchange. The retrieved data may include data from legacy systems, pre-existing enterprise applications and channels. The retrieved data may include service-related information. The service-related information may be retrieved from various systems across the enterprise that service consumers/developers.

The data may be retrieved from different application systems located in different physical and/or virtual locations. Such application systems may include external systems, such as an integrated technology and/or data and analytics platform that systems use to navigate a project or process lifecycle. Such application systems may include databases, mainframes and file systems, such as structured query language (SQL) server or Oracle. Data may also be received from real-time or event subscriptions. Data may also be received from loan modification systems or workflow systems related to loan modification. Data may also be retrieved from one or more servicing platforms. It should be appreciated that the data may be hosted at internal systems and/or external systems. However, the ownership of the data is with the system of record (SOR)—i.e., the provider of data.

The data retrieved may be placed into the data exchange. The data exchange may be a database. The database may be hosted on an Oracle Exadata Box. An Oracle Exadata box may be a computing appliance for running Oracle databases. The Oracle Exadata box may combine hardware and software to create a hybrid software/hardware machine tuned to run Oracle databases.

The data is typically retrieved during non-business hours, such as night hours. The data is typically retrieved in a batch mode, with multiple data elements being retrieved at substantially the same time, preferably in a single batch. The retrieval may be executed for different systems at different time intervals. The retrieved data is placed in the raw data section within the database. The data may also be ingested in real time continuously via event stream or Representational State Transfer (REST) or Simple Object Access Protocol (SOAP) application programming interfaces (APIs).

There may be a modeling process that is executed on the raw data in order to integrate the data. The modeling process models the data to avoid data redundancy and to decrease entropy. Entropy, in the context of this application, may be understood to be a rate of disorganization or randomness within a plurality of data elements. The data which has been modeled may be included in the model data layer. The data is provisioned out from the model data layer to consumers. Each of the consumers may be associated with a different application interface technology. Each of the consumers may be able to retrieve all the data it needs from one location as opposed to going to, for example, 50-100 SORs to retrieve the data. Additionally, the data retrieved by each of the consumers may be non-redundant and have decreased entropy.

It should be appreciated that the system may be a physical database. The system physically pulls the data, physically runs the modeling process to integrate the data and then physically provisions the data. As such, the system is not only a virtual system. It is a physical system as well.

The value provided by the system includes co-location of data, integration of different data files from various SORs into one data model and elimination of platform discrepancies and differences. In embodiments where the system is retrieving vendor data, the system may be a proxy to retrieve data stored on vendor environments.

Aspects of the Environment:
1. Pushing the raw data layer into the model data layer.
2. Capturing daily snapshots of the data that is changed daily and enabling consumers to retrieve each of the daily snapshots.
3. Enabling consumers to retrieve consumer-specific data.

Details Regarding Aspects of the Environment:
1. A job processing system for moving data between the raw data layer and the model data layer is provided.
2. A separate database that is invisible to the consumers and utilizes the Oracle Partition Exchange to perform daily data swapping to provide consumers historical data is provided.
3. A system for keeping a consumer-controlled schema for each consumer where the consumers are isolated from each other, the consumers adhere to a set of data movement control standards and the consumer's schemas consume less than a predetermined number of resources is provided.

Apparatus, methods and systems for hybrid job processing is provided. The system may include a data exchange. The data exchange may be resident on an Oracle Exadata box. The data exchange may include a raw data layer and a model data layer.

The data exchange may receive a plurality of records at the raw data layer. The plurality of records may be included in a plurality of tables from a plurality of SORs.

The data exchange may process the plurality of tables. The process may use a data model to model the received plurality of records included in the plurality of tables. The use of the data model to model the received plurality of records may include removing duplicate records from the plurality of records. The use of the data model to model the received plurality of records may include removing duplicate records from the plurality of records. The use of the data model to model the received plurality of records may include reformat of one or more records included in the plurality of records from ASCII format to a format consumable by the data exchange.

The model may include an arrangement of the plurality of tables in a plurality of predetermined sequences. Each of the predetermined sequences may include a list of one or more tables. Each of the predetermined sequences may include a root table.

The plurality of predetermined sequences may be modeled in parallel such that the processing of the root tables within each sequence is initiated concurrently. Processing the next table within each sequence may be initiated upon completion of processing of a prior table within each sequence. The process may transmit the modeled plurality of records to the model data layer.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
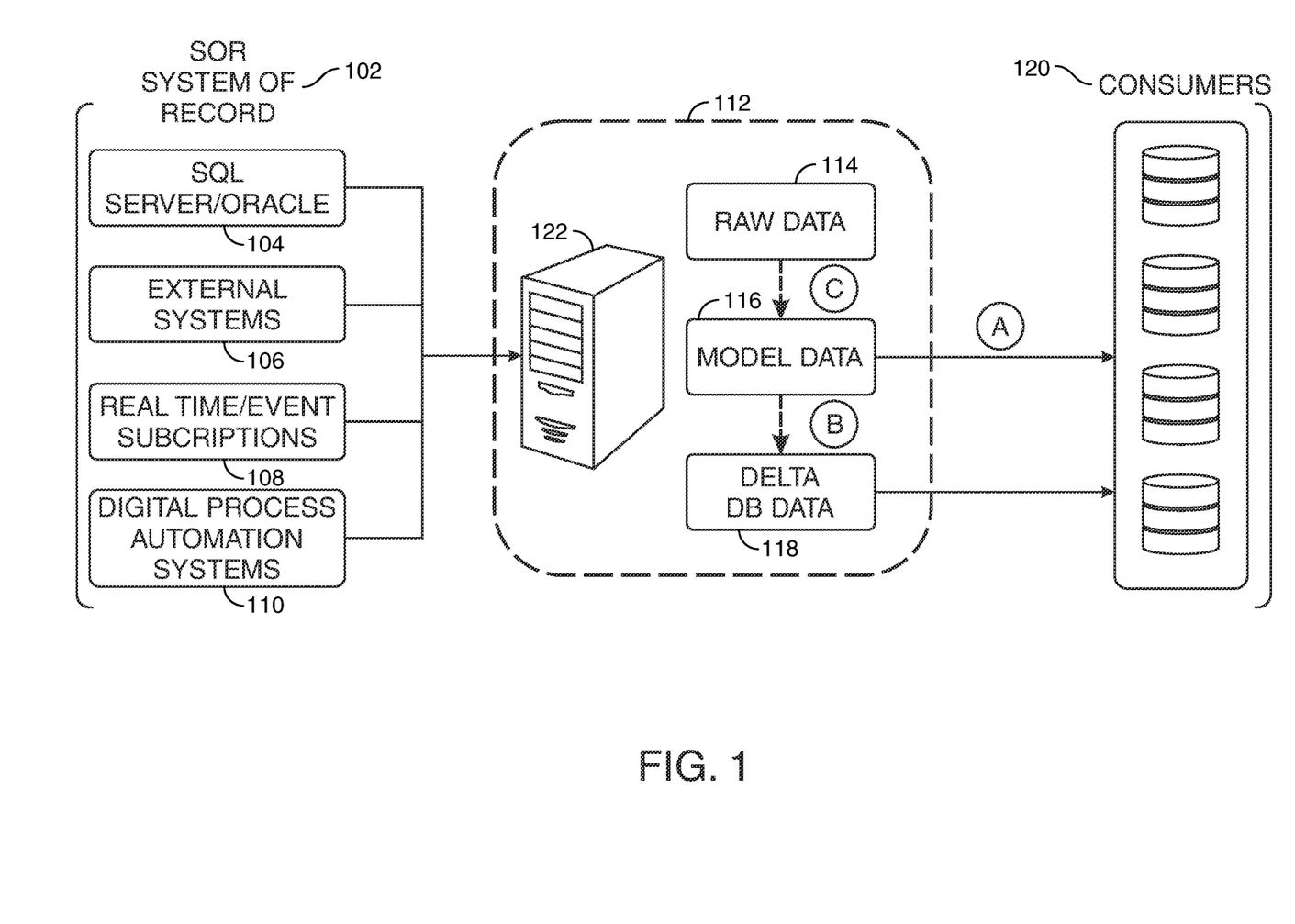
FIG. 1 shows an illustrative diagram in accordance with principles of the disclosure.

FIG. 1 shows an illustrative diagram. Data exchange 122 may be a database. Data exchange 122 may be hosted on box 112. Box 112 may be an Oracle Exadata box. Data exchange 122 may pull data from various SORs. The SORs may be shown at 102. The various SORs may include SQL server/Oracle, shown at 104, external systems, shown at 106, real-time event subscriptions, shown at 108 and digital process automation systems, shown at 110.

The raw data, as it is retrieved (or received) may be labeled raw data. Raw data may be located at raw data layer 114. Raw data layer 114 may be located within data exchange 122. Raw data may be modeled in order to remove data redundancy, decrease data entropy, and increase data integrity. The modeling may include reformatting the file format of the files. In one example, when files originate in a mainframe format, the original SOR may transfer the files from the mainframe format into an ASCII format. ASCII format may be readable by data exchange 122. Data exchange 122 may then reformat the file from ASCII format to an Oracle format.

The files may include one or more tables. The tables may include one or more records. The files may be received at a predetermined time within a predetermined time cycle. For example, the files may be received once a day during non-business hours. The received data may be processed. The processing includes modeling the data and moving the data from the raw data layer to the model data layer. Conventionally, data is processed either serially—i.e., one data table after another—or in parallel—i.e., all of the tables concurrently.

An example of serial processing is as follows: An exemplary data processing system may receive a loan table, a borrower table and a payment table in raw data format. The loan table, borrower table and payment table may require processing. The system may initially process the loan table.

After completion of the processing of the loan table, the system may process the borrower table. After completion of processing of the borrower table, the system may process the payment table. In one exemplary circumstance, serial processing for close to a billion records took more than 27 hours.

The length of time for serial processing created a challenge, specifically because the records may be needed in less than 10 hours. In one example, the records are received, as raw data, at raw data layer 114 at the end of a business day, which may be known as the beginning of non-business hours (for example, 10:00 PM Day 1). These records may have to be made available in model data layer 116 at the beginning of the next business day, which may be identified as the start of business hours (for example, 7:00 AM Day 2). As such, in this example, the time available for data processing and transition between raw data layer 114 and model data layer 116 is approximately 9 hours. In this case, close to a billion records were unable to process serially in the time allotted. Therefore, the need exists for a processing system and method different from serial processing.

An example of parallel processing is as follows: An exemplary data processing system may process all of the tables, such as a loan table, a borrower table and a payment table, in parallel. However, many of those tables have dependencies on one another. For example, a loan table may be dependent on a borrower table.

Parallel processing may have shortened the processing time, however, the dependencies between tables created a challenge. When the tables were loaded in parallel, the dependencies were lost.

Therefore, in order to maintain the dependencies between tables and in order to fit the job processing into the allotted available processing time, bulk data extract hybrid job processing is used.

Bulk data extract hybrid job processing combines the benefits of both serial data processing and parallel data processing. Bulk data extract hybrid job processing minimizes the challenges of both serial data processing and parallel data processing.

Bulk data extract hybrid job processing includes generating a plurality of sequences. Each of the sequences may have a group of tables with no interdependency among tables within the sequence. The tables may have dependency relationships between the sequences such that root tables may be in the initial sequence and leaf tables may be in the descendent sequence.

The hybrid job processing also includes grouping multiple tables in each sequence. The tables may be grouped based on the dependency relationship. The hybrid job processing may utilize the data model to determine the dependency relationships for grouping the tables. For example, a borrower table may be dependent on a loan table. As such, the loan table may not be grouped with the borrower table within a sequence. The sequence may consider that the loan table should complete processing prior to the initiation of the processing of the borrower table. The payment investor category may not be dependent on another table, and therefore, may be considered another root table. As such, the investor category table may be processed in parallel with the loan table.

The hybrid job processing runtime may complete execution after approximately 5 hours for close to a billion records.

Bulk data extract hybrid job processing is shown and described in more detail in connection with FIG. 4.

Once the data is located in model data layer 116, the data may be available to downstream consumers 120, also referred to herein as end users. The downstream consumers 120 may each require a different subset of data from the data included in model data layer 116. Also, each of downstream consumers 120 may want to create its own query, or list of queries, based on the model data layer 116.

Therefore, a self-service data provisioning system is provided. The self-service data provisioning system provides each consumer with a workspace within the data exchange. The workspace allows the consumer to create a schema. It should be appreciated that the workspace physically resides on data exchange 122. It should be further appreciated that data exchange 122 does not control or does not understand the logic that is being implemented by the schema.

The self-service data provisioning system enforces that the workspaces of the multiple consumers are isolated from each other. The self-service data provisioning system also enforces that each of the consumer's schemas adhere to a set of data movement control standards. The self-service data provisioning system also enforces that the schemas are coded to a degree of complexity which is less than a predetermined degree of complexity so that the schema does not slow down data exchange 122 or generate a failure at data exchange 122.

Self-service data provisioning system is shown and described in more detail in connection with FIG. 2 below.

In addition to providing model data layer 116 to the consumers via the self-service data provisioning system, data exchange also includes delta database data layer 118. Delta database data layer 118 may receive data concurrently with model data layer 116. As such, when data is written from raw data layer 114 to model data layer 116, data is also written from model data layer 116 to delta database data layer 118.

Delta database data layer 118 may include a plurality of snapshots of data updates that were pushed to model data layer 116. For example, the delta database data layer 118 may include the most recent ninety days' worth of data in a set of partitions. As such, a consumer may be able to access changes to daily historic data using the delta database data layer 118. It should be appreciated that model data layer 116 provides the most recent data to a consumer. However, in order to access specific historic data, delta database data layer 118 is accessed.

Delta database data layer 118 may be configured for each table. As such, each table may maintain its own days' worth of historic data. There may be a default value for the amount of days' worth of historic data available. For example, delta database data layer 118 may maintain ninety days' worth of data for a loan table and delta database data layer 118 may maintain three-hundred-and-sixty-five (365) days' worth of data for a payment table. The default value for the amount of days' worth of historic data may be ninety days.

Delta database is shown and described in more detail below in connection with FIG. 3 below.

Figure 2:
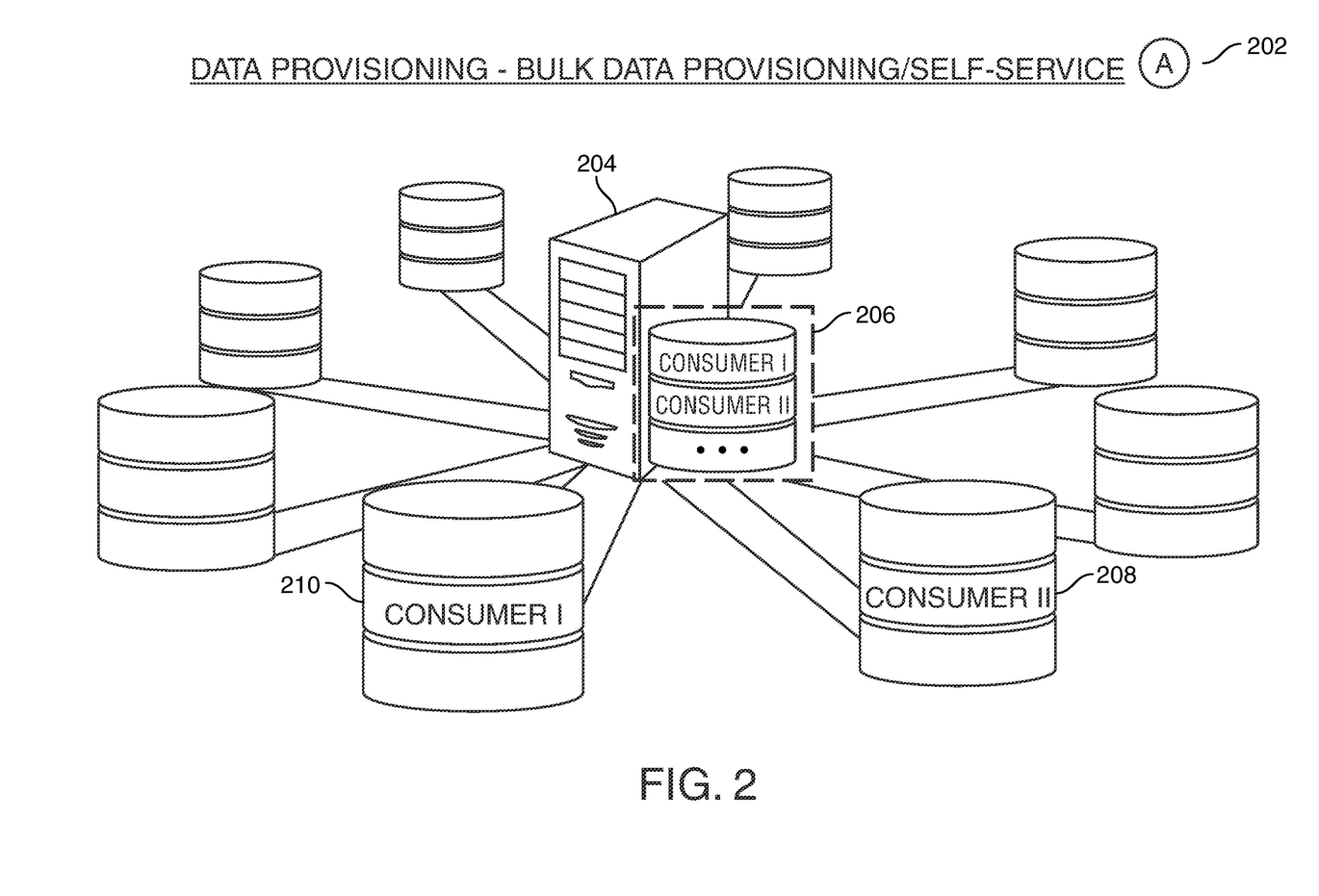
FIG. 2 shows another illustrative diagram in accordance with principles of the disclosure.

FIG. 2 shows an illustrative diagram. The illustrative diagram shows a data provisioning—bulk data provisioning—self-service system 202. Self-service system 202 may describe the process in which consumers may retrieve data from data exchange 204. It should be appreciated that the letter A, shown adjacent to self-service, may indicate that the process shown in FIG. 2 corresponds to the process indicated by the letter A shown in FIG. 1.

Data exchange 204 is shown. Various consumers, such as consumer one, shown at 210 and consumer two, shown at 208, may retrieve data, or query the data included in data exchange 204. Each of consumers one and two may have a workspace within data exchange 204. The workspaces are shown at 206.

Each of the consumers may create their own view of the data within the workspace. The view of the data may include one or more selected SQL queries and/or one or more implemented business logic elements. Each view of the data may query a portion of the data, such as one or more tables. Each view of the data may also query the entirety of the data. Each view of the data may provide the consumer with information that is significant for that specific consumer.

The data exchange may ensure that each of the consumer's workspace is isolated from each other. As such, the queries may be executed on the data included in the data exchange, however, the results of the queries may be made available only in the consumer's workspace. Additionally, each of the consumers may be unable to alter the data within the data exchange. Rather, each of the consumers may be able to build on top of the data that has been published in the data exchange. In order that the data within the data exchange remains unchanged, the consumer's workspaces may be separate from each other and that the consumer's workspaces sit on top of the data published to the data exchange.

Additionally, the data exchange may enforce that the consumers adhere to a set of data movement control standards. The set of data movement control standards may ensure that data is not lost when data is moved from a first entity to a second entity within an enterprise. One data movement control may include determining whether the number of records transmitted from the first entity was the number of records received at the second entity.

In one embodiment, the system may generate a count prior to the data move and generate a count after the data move. The receiver entity may generate a count of the records received. The receiver entity may transmit the count to the transmitter entity for validation. The transmitter entity may validate that the number of records is the correct number of records. The transmitter entity and/or the receiver entity may generate a log entry stating that the number of records received at the receiver entity was the same number of records transmitted from the transmitter entity.

Other times, the control data—i.e., the number of records—may be transmitted from the transmitter entity to the receiver entity together with the data records. The receiver entity may generate a record count once the records are received. The receiver entity may validate the record count, generated at the receiver entity, against the record count received from the transmitter entity. The receiver entity may be able to determine, based on the validation, whether all of the records were received.

At times, data published from the SORs to the data exchange may include control data. The control data may include metadata relating to the published data. An example of control data may include record count data. These data movement controls ensure that data does not get lost during data movement within an entity. Additionally, the data movement controls track activity user identifiers to serve audit purpose and to comply with data security requirements.

In order to implement the data movement controls, Oracle stored procedures were used initially. However, Oracle stored procedures took greater than a predetermined time period to generate record counts within the consumer's workspaces. Therefore, in-line functions based on Oracle code and Oracle structures were generated. These in-line functions may be invoked by consumers within the workspaces. It should be noted that in-line functions took less than a predetermined time period to generate record counts within the workspaces.

Additionally, the data exchange may ensure that the scripts that are being run in each of the workspaces are less than a predetermined level of coding complexity and utilize less than a predetermined number of resources. This is because in the event that the data exchange runs a large number of scripts that are greater than a predetermined level of coding complexity and utilize more than a predetermined number of resources, the data exchange will slow down and not be able to produce results within a predetermined time period.

In order to ensure that the scripts being run in each of the workspaces are less than a predetermined level of coding complexity and utilize less than a predetermined number of resources, each of the scripts may be transmitted to a testing environment prior to being implemented. The testing environment may run an Oracle stats test on each script received. The Oracle stats test may generate a test result. The test result may include various testing specifications. The testing specifications may include resource utilization specifications, coding complexity specifications, approximated amount of time for script completion and/or a plurality of other testing specifications.

The test result may be transmitted from the testing environment to the entity attempting to run the script. The entity may upload the test result together with the script within the workspace. If the test result indicates that the script is less than a predetermined level of coding complexity, consumes less than a predetermined number of resources and/or satisfies any other suitable testing specifications, the script may be validated for execution within the workspace. Once the script is validated for execution, the script may be executed within the workspace.

However, if the test result indicates that the script is more than a predetermined level of coding complexity, consumes more than a predetermined number of resources and/or does not satisfy any other suitable testing specifications, the script may be denied execution within the workspace. A denial message may be transmitted to the entity.

In some embodiments, the test result may include a pass indicator or a failure indicator. The pass indicator may indicate that the script passes the testing specifications. The failure indicator may indicate that the script fails the testing specifications. At times, the test result may not include further information regarding the testing specifications.

In certain embodiments, additional testing may be performed on the script. The additional testing may include periodic review of data movement audit logs and script performance to ensure that the testing specifications are satisfied on an ongoing basis. The additional testing may also review the script itself and the in-line functions within the script to ensure that the testing specifications are satisfied on an ongoing basis.

It should be appreciated that the testing specifications may be configurable. For example, the threshold for maximum resource utilization may be configurable. As such, certain scripts may be rejected when the threshold is set to a first number, however, those rejected scripts may be accepted when the threshold is set to a second number.

Additionally, in order to enable the data downloads from a large number of consumers daily, the system includes a tiered data download section. As such, the consumers are classified into three different tiers. The tiers may be based on operational rank. High operational ranking consumers may be labeled platinum preferred consumers. Medium operational ranking consumers may be labeled preferred consumers. Standard operational ranking consumers may be labeled standard consumers.

The data download may be divided into time windows. A first time window may be assigned to the platinum preferred consumers. The first time window may be between approximately 2:00 AM EST (Eastern Standard Time) to 5:00 AM EST. A second time window may be assigned to the preferred consumers. The second time window may be between approximately 5:00 AM EST to 6:00 AM EST. A third time window may be assigned to the standard consumers. The third time window may be between approximately 6:00 AM EST-7:00 AM EST.

Furthermore, if there are two data download jobs from consumers in different tiers, the priority will be assigned to the consumer on the higher tier. Once the download job from the consumer on the higher tier is initiated (and/or completed), the download job from the consumer on the lower tier may be initiated.

Figure 3:
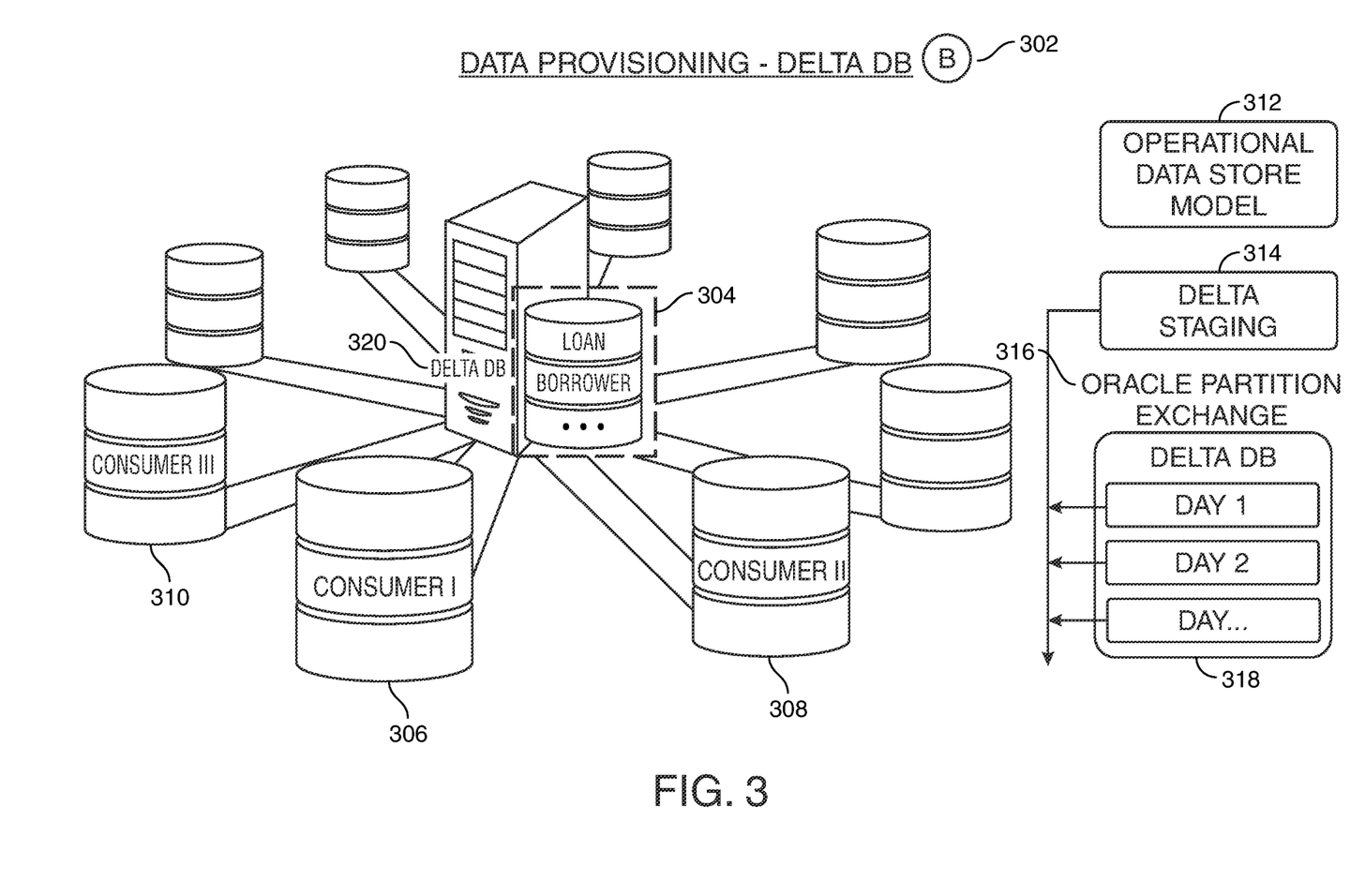
FIG. 3 shows yet another illustrative diagram in accordance with principles of the disclosure.

FIG. 3 shows an illustrative diagram. The illustrative diagram shows a data provisioning—delta database system 302. It should be appreciated that the letter B, shown adjacent to delta database, may indicate that the process shown in FIG. 3 corresponds to the process indicated by the letter B shown in FIG. 1.

Delta database system 302 may describe the process in which daily snapshots are stored to a separate delta database in addition to the model data database.

In some embodiments, when raw data is written to the model database daily, the raw data includes the changes made to the data records in the SORs. The changes are then written over the data included in the model data.

In some embodiments, raw data is written to the model data layer daily, and raw data is changed on a daily basis and imparts the changes to the model data.

As such, the model data includes the most updated data. However, the model data does not include historical data. Operational data store (ODS) model, shown at 312, may represent the model database shown in FIG. 1.

Delta database system 302 may provide daily historical data, shown at 304, to consumers, such as consumer 1, shown at 306, consumer 2, shown at 308 and consumer 3, shown at 310. When the raw data is written to the model data database, the raw data may also be written to delta database 320. In delta database 320, the data may be stored incrementally as opposed to rewriting previous data. As such, historical data, that identifies the changes from each day, may be made available in delta database system 302.

Delta database 320 may include various elements. Firstly, delta database 320 may include delta staging 314. Delta database 320 may also include a plurality of partitions, as shown at 318. In order to maintain partitions between each day of data, Oracle partition exchange 316 may be used.

Data may be written from the raw data layer to ODS model 312 and delta staging 314. Delta staging 314 may be invisible to the consumers. Because the incremental data is being written to ODS model 312 continuously throughout the day, it may not be highly resource consumptive to also write the incremental data to delta database 318.

It should be appreciated that, at times, ODS model 312 may determine the difference between the updated data being transmitted and the data currently being housed in ODS model 312. In such embodiments, raw data may not identify the changes to be written to ODS model 312, rather, ODS model 312 may identify a list of changes based on the data received. In such embodiments, ODS model 312 may generate a change log each time a change is received and identified. Each change log may be transmitted from ODS model 312 to delta staging 314.

Also, incremental changes may not be kept infinitely. The partition exchange only holds a predetermined number of days. As such, whatever the partition exchange is configured to hold, it is a finite number of days. It is preferably not an expanding exchange. It is a configurable exchange, meaning the number of days can be changed. However, the number of days is a predetermined number of days.

Therefore, a swapping element is used. The swapping element may, once daily, swap the contents of delta staging 314 for the contents of the partition that holds the oldest data elements currently housed within the partition exchange. The contents swap may delete the contents of the oldest partition, replace with the contents of delta staging 314 and delete the contents of delta staging 314. Deleting the contents of delta staging 314 may enable data from the next day to be entered to delta staging 314. It should be noted that the swap may be executed one time per day because if the swap would happen continuously, data within the partition would be cut off.

The delta database may enable a consumer to be able to access details relating to a specific day that is available within the partition exchange.

There is a technical challenge associated with date stamping of records within delta staging 314, within partition exchange 318 and during the swap between delta staging 314 and partition exchange 318.

Firstly, when the dates were stamped on the data within the delta staging 314, it caused a time increase in the data swap between delta staging 314 and partition exchange 318.

Therefore, a delta database configuration table was generated. The delta database configuration table stored the date for each table and populated the date from configuration table while loading the records from operational data store model 312 to delta staging 314.

There exists a need to label each data record with a date time value. There were numerous attempts to label each data record with a date time value received.

In a first attempt, the data is moved from the staging table to the partition exchange. Once the data is in the partition exchange, the system may be required to update all of the records in the table (now hosted within the partition exchange) with the correct date. As such, at the partition exchange, the system ran an update statement within the partition exchange to update the date for all of the records that were added in this specific date to the partition exchange. However, this took a relatively lengthy time period (approx. 2 hours) to update the records with the date within the partition exchange. Because this update statement took greater than a predetermined time period to update the records, this option was a faulty attempt.

In a second attempt, the system generated a script that adds a column to the tables within the delta staging table. The column may be a date column. The date column may initially be populated with null values. The system then ran an update statement. The update statement updated the date for all of the values in tables included in the delta staging table. Additionally, it should be noted that the tables are transferred from the delta staging table to a partition within the Oracle partition exchange between the hours of 10:00 PM EST and 2:00 AM EST. The update statement may continuously stamp each table as the tables are being processed. The continuous stamp may retrieve the current date and stamp the table with the current date. Therefore, in the event that a table is processed and transferred after 12:00 AM EST, that table will be mislabeled with the following day's date even though it was received on the previous day's date. Therefore, such an attempt may mislabel records processed after 12:00 AM EST.

A third attempt may be to run the update statement of the second attempt on a continuous basis, however, such an update statement may not be available to run on a continuous basis. Therefore, it may be difficult for the system to run the update statement each time a record is received.

In order to solve the deficiencies of attempts one, two and three, a configuration table may be generated within the delta staging layer. The configuration table may maintain metadata relating to each table. The configuration table may be updated with a date time value of the receipt time of each table within the delta staging layer. The configuration table may maintain a record identifier associated with the date time value of the receipt time of each table. The system may also run the script that adds the date column to the tables within the delta staging table. As stated in connection with attempt two, the date column may initially be populated with null values. However, when the records are loaded from the model data layer to the delta staging layer, the date values are pulled from the configuration table and populated into the date column.

Figure 4:
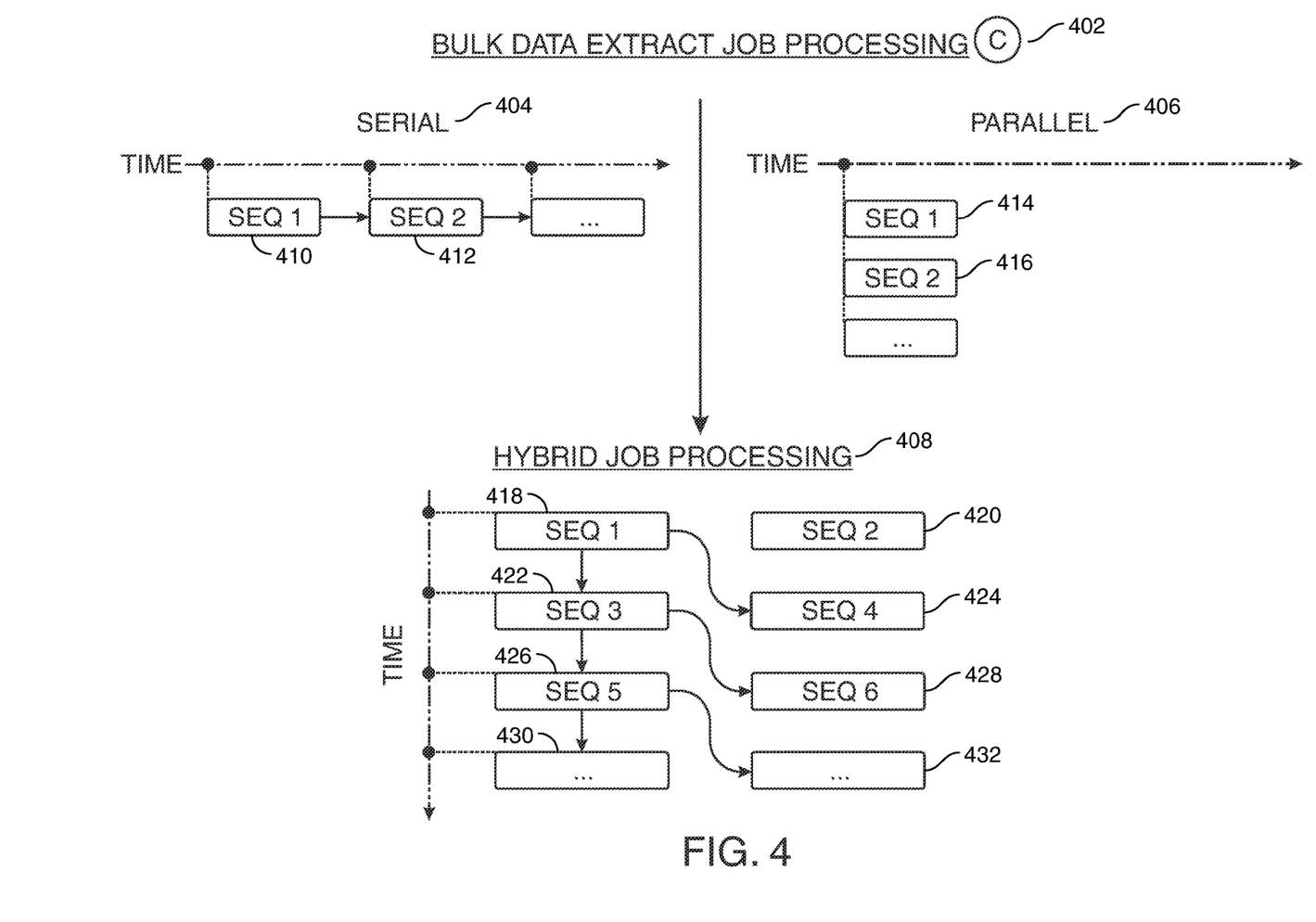
FIG. 4 shows still another illustrative diagram in accordance with principles of the disclosure.

FIG. 4 shows an illustrative diagram. The illustrative diagram shows a bulk data extract job processing system 402. It should be appreciated that the letter C, shown adjacent to bulk data extract job processing, may indicate that the process shown in FIG. 4 corresponds to the process indicated by the letter C shown in FIG. 1.

Bulk data extract job processing system 402 includes processing the data prior to, or concurrent with, passing the data from the raw data layer to the model data layer. The processing may include modeling the data, reformatting the data or any other suitable processing. The processing may ensure that the data is in a format that is consumable by an Oracle system.

Conventionally, data may be processed in a serial manner, as shown at 404, or in a parallel manner, as shown at 406. Serial processing 404 may include processing a first sequence, shown at 410, followed by a second sequence, shown at 412, followed by a third sequence, etc. Parallel processing 406 may include processing a first sequence, shown at 414, a second sequence, shown at 416 and any other sequences simultaneously.

An example of serial processing is as follows: An exemplary data processing system may receive a loan table, a borrower table and a payment table in raw data format. The loan table, borrower table and payment table may require processing. The system may initially process the loan table. After completion of the processing of the loan table, the system may process the borrower table. After completion of processing of the borrower table, the system may process the payment table. In one exemplary circumstance, serial processing for close to a billion records took more than 27 hours.

The length of time for serial processing created a challenge, specifically because the records may be needed in less than 5 hours. In one example, the records are received, as raw data, at raw data layer 114 at the end of a business day, which may be known as the beginning of non-business hours (for example, 10:00 PM Day 1). These records may have to be made available in model data layer 116 at the beginning of the next business day, which may be identified as the start of business hours (for example, 7:00 AM Day 2). As such, in this example, the time available for data processing and transition between raw data layer 114 and model data layer 116 is approximately 9 hours. In this case, close to a billion records were unable to process serially in the time allotted. Therefore, the need exists for a processing system and method different from serial processing.

An example of parallel processing is as follows: An exemplary data processing system may process all of the tables, such as a loan table, a borrower table and a payment table, in parallel. However, many of those tables have dependencies on one another. For example, a borrower table may be dependent on a loan table.

Parallel processing may have shortened the processing time, however, the dependencies between tables created a challenge. When the tables were loaded in parallel, the dependencies were lost.

Therefore, in order to maintain the dependencies between tables and in order to fit the job processing into the allotted available processing time, bulk data extract hybrid job processing 408 is used.

Bulk data extract hybrid job processing combines the benefits of both serial data processing and parallel data processing. Bulk data extract hybrid job processing minimizes the challenges of both serial data processing and parallel data processing.

Bulk data extract hybrid job processing 408 includes generating a plurality of sequences. Each of the sequences may have a group of tables with no interdependency among tables within the sequence. The tables may have dependency relationships between the sequences such that root tables may be in the original sequence and leaf tables may be in the dependent sequence.

The hybrid job processing also includes grouping multiple tables in each sequence. The tables may be grouped based on the dependency relationship. The hybrid job processing may utilize the data model to determine the dependency relationships for grouping the tables. For example, a borrower table may be dependent on a loan table. As such, the loan table may not be grouped with the borrower table within a sequence. The sequence may consider that the loan table should complete processing prior to the initiation of the processing of the borrower table. The investor category table may not be dependent on another table, and therefore, may be considered another root table. As such, the payment table may be processed in parallel with the loan table.

The hybrid job processing runtime may complete execution after approximately 5 hours for close to a billion records.

Hybrid job processing shown at 408 may include sequence 1, shown at 418, sequence 2, shown at 420, sequence 3, shown at 422, sequence 4, shows at 424, sequence 5, shown at 426, sequence 6, shown at 428, further sequences shown at 430 and 432. It should be appreciated that the odd and even sequences may have dependencies on preceding odd sequences. The odd sequences may have dependent sequences—i.e., the odd sequence shown at 426 may be dependent on 422 which it run may be dependent on 418. The even sequences may not have dependent sequences. All of the even sequences, shown at 420, 424, 428 and 432, may be dependent on preceding odd sequences. Hybrid job processing shown at 418 and 420 may be initiated concurrently. Initiation of 422 and 424 may happen as soon as 418 is completed, irrespective of whether 420 is completed. Similarly, initiation of 406 and 428 may happen as soon as execution of 422 is completed, irrespective of whether 420 or 424 is completed. Similar protocol of execution may be followed for all sequences. Hybrid job processing may maintain the overall execution time to a minimum by leveraging the grouping of tables in a sequence based on the referential integrity constraints.

Thus, bulk data extract hybrid job processing is provided. Persons skilled in the art will appreciate that the present invention can be practiced by other than the described embodiments, which are presented for purposes of illustration rather than of limitation. The present invention is limited only by the claims that follow.

One or more non-transitory computer-readable media storing computer-executable instructions which, when executed by a processor on a computer system, perform a method for hybrid job processing, the hybrid job processing comprising modeling and transferring data from a raw data layer for delivering to a model data layer.

What is claimed is:

1. A method for hybrid job processing, the hybrid job processing comprising modeling raw data from a raw data layer to modeled data in a model data layer, the method comprising:
   receiving raw data records, said raw data records comprising a plurality of tables from a plurality of systems of record, at the raw data layer within a data exchange;
   generating a data model from the raw data records, the data model comprising one or more dependencies within the plurality of tables, wherein each table in a second subset of the plurality of tables is dependent on at least one table in a first subset of the plurality of tables;
   processing, at a computer processor:
      the first subset of tables using parallel processing; and
      the second subset of the tables using serial processing, wherein processing is initiated for each table in the second subset when a table with an associated dependency is complete;
   said processing comprising:
      modeling the raw data records stored in the first subset of the plurality of tables at the raw data layer to form modeled records; and
      transmitting the modeled records in the first subset of tables to the model data layer;
   wherein:
      each of the tables in the plurality of tables is labeled based on a sequence of numbers; and
      the first subset of tables comprises root tables labeled with an odd number and the second subset of tables comprises leaf tables labeled with an even number, each leaf table dependent on a root table.

2. The method of claim 1, wherein the data exchange resides on an Oracle Exadata box.

3. The method of claim 1, wherein the modeling the raw data records comprises removing duplicate records from the raw data records.

4. The method of claim 1, wherein the modeling the raw data records comprises reformatting the raw data records from ASCII format to a format consumable by the data exchange.

5. The method of claim 1, wherein the hybrid job processing reduces a processing time of more than half a billion records from over 27 hours to under 5 hours.

6. The method of claim 1, wherein the hybrid job processing reduces a processing time of the raw data records by over 70%.

7. A method for hybrid job processing, the hybrid job processing comprising modeling raw data from a raw data layer to modeled data in a model data layer, the method comprising:
   receiving raw data records, said raw data records stored within a plurality of tables from a plurality of systems of record, at the raw data layer within a data exchange;
   generating, based on a data model from the raw data records, the data model comprising one or more dependencies within the plurality of tables, wherein each table in a second subset of the plurality of tables is dependent on at least one table in a first subset of the plurality of tables;
   processing, at a processor:
      the first subset of tables using parallel processing; and
      the second subset of tables using serial processing, wherein processing is initiated for each table in the second subset when a table with an associated dependency is complete;
   said processing comprising:
      modeling the raw data records stored in the second subset of the plurality of tables at the raw data layer to form modeled records; and
      transmitting the modeled data records in the first subset of the plurality of tables to the model data layer; and
   wherein:
      each of the tables in the plurality of tables is labeled based on a sequence of numbers; and
      the first subset of tables comprises root tables labeled with an odd number and the second subset of tables comprises leaf tables labeled with an even number, each leaf table dependent on a root table.

8. The method of claim 7, wherein the data exchange resides on an Oracle Exadata box.

9. The method of claim 7, wherein the modeling the raw data records comprises removing duplicate records from the raw data records.

10. The method of claim 7, wherein the modeling the raw data records comprises reformatting the raw data records from ASCII format to a format consumable by the data exchange.

11. The method of claim 7, wherein the hybrid job processing reduces a processing time of more than half a billion records from over 27 hours to under 5 hours.

12. The method of claim 7, wherein the hybrid job processing reduces a processing time of the raw data records by over 70%.

* * * * *